(12) United States Patent
Oda et al.

(10) Patent No.: US 11,506,135 B2
(45) Date of Patent: Nov. 22, 2022

(54) ENGINE SYSTEM

(71) Applicant: Mazda Motor Corporation, Hiroshima (JP)

(72) Inventors: Yusuke Oda, Aki-gun (JP); Naoki Mine, Aki-gun (JP); Tomomi Watanabe, Aki-gun (JP); Korin Hata, Aki-gun (JP); Junsou Sasaki, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/684,315

(22) Filed: Mar. 1, 2022

(65) Prior Publication Data

US 2022/0307452 A1   Sep. 29, 2022

(30) Foreign Application Priority Data

Mar. 26, 2021   (JP) .............................. JP2021-053081

(51) Int. Cl.
| | |
|---|---|
| *F02D 21/08* | (2006.01) |
| *F02M 35/10* | (2006.01) |
| *F02M 26/20* | (2016.01) |
| *F02M 26/21* | (2016.01) |
| *F02B 39/00* | (2006.01) |

(52) U.S. Cl.
CPC ............. *F02D 21/08* (2013.01); *F02M 26/20* (2016.02); *F02M 26/21* (2016.02); *F02M 35/10262* (2013.01); *F02B 39/00* (2013.01)

(58) Field of Classification Search
CPC ........ F02D 21/08; F02M 26/20; F02M 26/21; F02M 35/10262; F02B 39/00
See application file for complete search history.

(56) References Cited

U.S. PATENT DOCUMENTS

| 9,897,037 B2* | 2/2018 | Sasaki .................. F02D 41/402 |
|---|---|---|
| 2021/0025347 A1 | 1/2021 | Ohura et al. |

FOREIGN PATENT DOCUMENTS

JP       2002130025 A      5/2002

OTHER PUBLICATIONS

European Patent Office, Extended European Search Report Issued in Application No. 22154698.9, dated Jul. 18, 2022, Germany, 8 pages.

* cited by examiner

*Primary Examiner* — Xiao En Mo
(74) *Attorney, Agent, or Firm* — Alleman Hall Creasman & Tuttle LLP

(57) ABSTRACT

An engine system is provided, which includes an engine, a swirl control valve, and a controller. The engine includes a cylinder, a piston, and a fuel injection valve provided incliningly with respect to an axial direction of the piston and configured to directly inject fuel into the cylinder. The swirl control valve is provided inside an intake passage and generates a swirl flow inside the cylinder at least when the valve closes. When an engine load is below a given threshold, the controller controls the swirl control valve to close, and controls the fuel injection valve to inject fuel during an intake stroke. While the engine load is below the threshold, at a fixed engine speed, the controller controls to advance a fuel injection timing when the engine load is at a first load, compared with at a second load higher than the first load.

19 Claims, 8 Drawing Sheets

ENGINE SYSTEM

TECHNICAL FIELD

The present disclosure relates to an engine system having a swirl control valve which generates a swirl flow inside a cylinder.

BACKGROUND OF THE DISCLOSURE

Conventionally, technologies are known, in which a swirl control valve (hereinafter, suitably be referred to as an "SCV") is provided to one of two intake ports which supply intake air to each cylinder, and opening of the SCV is set to a close side (e.g., fully closed) to generate a swirl flow inside the cylinder. For example, JP2002-130025A discloses a technology to switch opening of such an SCV according to an operation state of an engine. In detail, the SCV is closed in a low load range of the engine, and is opened in a high load range. Particularly, in the low load range, fuel is injected during a compression stroke while a swirl flow is generated so as to achieve an operation with stratified-charge combustion, whereas in the high load range, fuel is injected during an intake stroke while a tumble flow is generated so as to achieve an operation with homogeneous combustion.

Meanwhile, in order to achieve homogeneous combustion in the low load range, it can be considered to perform control to generate the swirl flow inside the cylinder by the SCV, and carry out injection (typically, batch injection) of fuel during an intake stroke. However, when such control is performed, since a gas flow inside the cylinder is weak in the low load range, fuel is distributed unevenly inside the cylinder and combustion may become unstable.

SUMMARY OF THE DISCLOSURE

The present disclosure is made in view of solving the problem described above, and one purpose thereof is to provide an engine system which generates a swirl flow inside a cylinder by a swirl control valve and injects fuel during an intake stroke in a low load range, and to secure combustion stability by reducing uneven distribution of fuel inside the cylinder.

According to one aspect of the present disclosure, an engine system is provided, which includes an engine, a swirl control valve, and a controller. The engine includes a cylinder defining a combustion chamber, a piston configured to reciprocate inside the cylinder, and a fuel injection valve provided inclininingly with respect to an axial direction of the piston and configured to directly inject fuel into the cylinder. The swirl control valve is provided inside an intake passage and generates a swirl flow inside the cylinder at least when the swirl control valve closes, the intake passage being configured to supply intake air to the cylinder. The controller controls the fuel injection valve and the swirl control valve. When an engine load is below a given threshold, the controller controls the swirl control valve to close, and controls the fuel injection valve to inject fuel during an intake stroke of the engine. While the engine load is below the threshold, at a fixed engine speed, the controller controls the fuel injection valve to advance a fuel injection timing when the engine load is at a first load, compared with when the engine load is at a second load higher than the first load.

According to the engine system of this configuration, in a low load range where the engine load is below the given threshold, the swirl control valve (SCV) generates the swirl flow and fuel is injected during an intake stroke. Further, at the fixed engine speed in such a low load range, the controller advances the fuel injection timing when the engine load is at the first load, compared with when the engine load is at the second load (which is higher than the first load). According to this, even when the flow inside the combustion chamber is weakened due to the decrease in the engine load, the mixability of fuel and intake air inside the combustion chamber can be secured by advancing the fuel injection timing corresponding to the decrease in the engine load. That is, the period of time for the mixing of fuel and intake air inside the combustion chamber can be secured. As a result, according to this configuration, in the low load range, uneven distribution of fuel inside the combustion chamber can appropriately be prevented, thus securing of combustion stability being possible.

The engine system may further include an exhaust gas recirculation (EGR) passage configured to recirculate exhaust gas of the engine as EGR gas to the intake passage, and an EGR valve provided to the EGR passage and configured to adjust an amount of EGR gas to be recirculated to the intake passage. While the engine load is below the threshold, at a fixed engine speed, the controller may control the EGR valve to reduce the amount of EGR gas when the engine load is at the first load, compared with when the engine load is at the second load.

In the low load range, as the amount of EGR gas increases, combustion stability tends to decline. Thus, according to this configuration, at the fixed engine speed in the low load range, the controller controls the EGR valve to reduce the amount of EGR gas when the engine load is at the first load, compared with when the engine load is at the second load. As a result, combustion stability can effectively be secured in the low load range.

When the engine load is below the threshold, the controller may control the fuel injection valve to inject fuel once during an intake stroke.

According to this configuration, in the low load range, by injecting fuel all at once during an intake stroke, a homogeneous combustion can appropriately be achieved in the engine.

When the engine load is at or above the threshold, the controller may control the swirl control valve to open, and control the fuel injection valve to inject fuel a plurality of times from an intake stroke to a compression stroke.

According to this configuration, in the high load range (the engine load is at or above the threshold), by opening the SCV and dividedly injecting fuel from an intake stroke to a compression stroke, stratified-charge combustion can appropriately be achieved in the engine.

A crown surface of the piston may be formed to be substantially flat without a cavity.

According to this configuration, the swirl flow inside the combustion chamber can effectively be maintained.

When the fuel injection is split into a first injection, a second injection, and a third injection in this order, the controller may set a split ratio of an amount of the first injection to be higher than a split ratio of an amount of each of the second injection and the third injection, and set the split ratio of the amount of the second injection to be higher than the split ratio of the amount of the third injection.

The controller may set the split ratio of the amount of the first injection to be higher as the engine load increases.

DETAILED DESCRIPTION OF THE DISCLOSURE

Hereinafter, an engine system according to one embodiment of the present disclosure is described with reference to the accompanying drawings.

Configuration of Engine System

Figure 1:
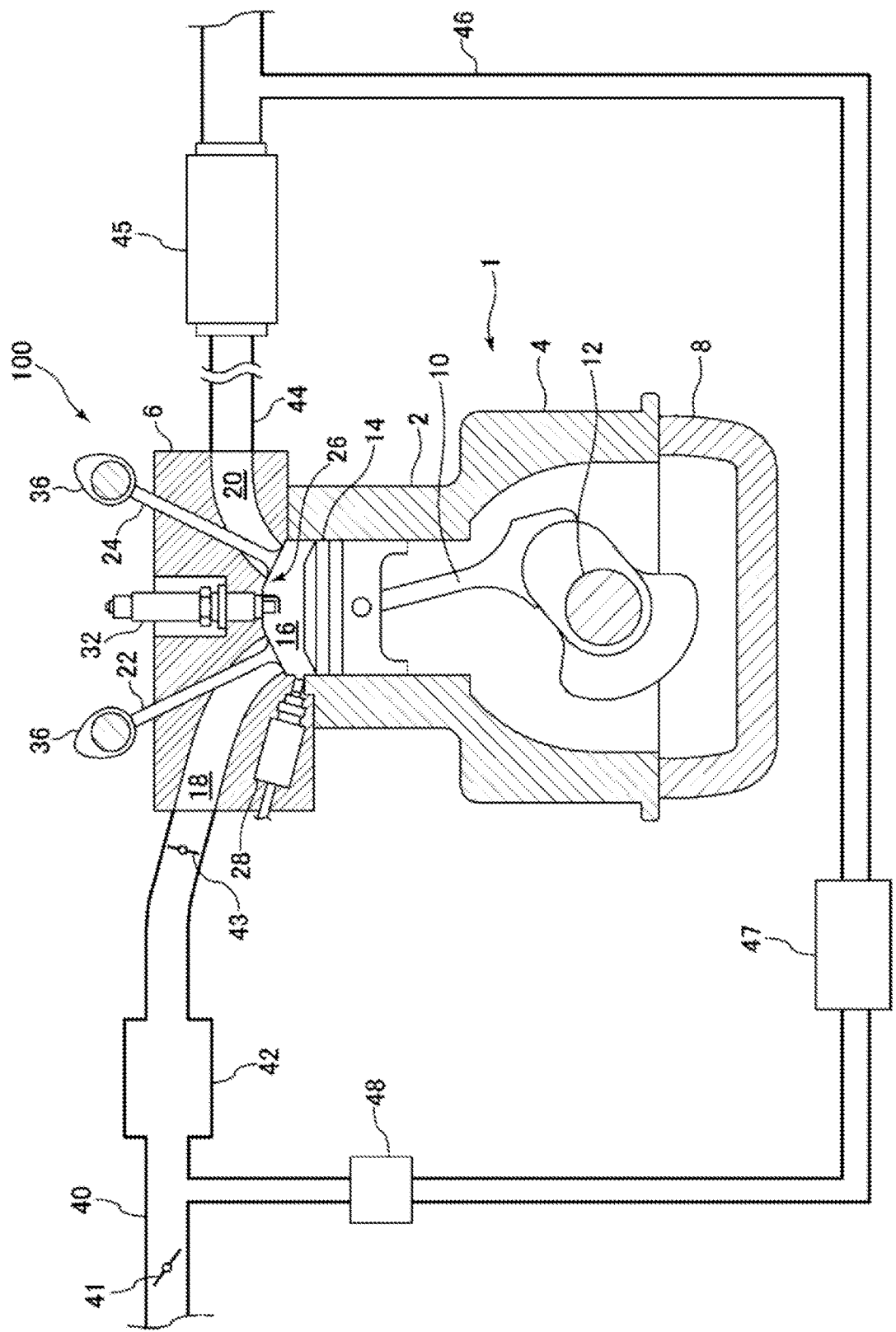
FIG. 1 is a diagram schematically illustrating a configuration of an engine system according to one embodiment of the present disclosure.

FIG. 1 is a diagram schematically illustrating a configuration of the engine system according to this embodiment. As illustrated in FIG. 1, an engine system 100 includes an engine 1 mounted on a vehicle. The engine 1 is a gasoline engine to which fuel at least containing gasoline is supplied. In detail, the engine 1 includes a cylinder block 4 provided with cylinders 2 (note that, although one cylinder 2 is illustrated in FIG. 1, for example, four cylinders 2 may be aligned in a row), a cylinder head 6 provided above the cylinder block 4, and an oil pan 8 provided below the cylinder block 4 and storing lubricant therein. A piston 14 which is coupled to a crankshaft 12 via a connecting rod 10 is reciprocatably inserted into each cylinder 2. The cylinder head 6, the cylinder 2, and the piston 14 define a combustion chamber 16 of the engine 1.

Intake air is supplied to the engine 1 from an intake passage 40. The intake passage 40 is provided thereon with a throttle valve 41 which is adjustable of an amount of intake air to be supplied to the engine 1, and a surge tank 42 which temporality stores intake air to be supplied to the engine 1. Further, part of the intake passage 40 constitutes an intake port 18 connected to the engine 1.

Two independent intake ports 18 and two independent exhaust ports 20 are connected to the engine 1 for each cylinder 2, and the intake ports 18 and the exhaust ports 20 are provided with intake valves 22 and exhaust valves 24 which open and close openings on the combustion chamber 16 side, respectively. Here, in response to opening of the intake valve 22 and descending of the piston 14, a tumble flow (vertical (longitudinal) vortex) is generated by intake air flowed into the combustion chamber 16 from the intake port 18.

Further, one of the two intake ports 18 for each cylinder 2 is provided with a swirl control valve (SCV) 43 which opens and closes a flow passage of the intake port 18. Note that, in FIG. 1, only one intake port 18 to which the SCV 43 is provided is illustrated, and the other intake port 18 without the SCV 43 is not illustrated. When the SCV 43 is closed, intake air is flowed into the combustion chamber 16 only from one of the two intake ports 18, and therefore, a swirl flow (horizontal (transverse) vortex) is generated inside the combustion chamber 16.

A lower surface of the cylinder head 6 of the engine 1 forms a ceiling 26 of the combustion chamber 16. This ceiling 26 is a so-called pentroof type in which two opposing sloped surfaces are provided so as to extend from a central part of the ceiling 26 to a lower end of the cylinder head 6. Further, the cylinder head 6 is attached, for each cylinder 2, with a (direct injection) injector (fuel injection valve) 28 which directly injects fuel into the cylinder 2. The injector 28 is provided incliningly with respect to an axial direction of the piston 14 (i.e., a moving direction of the piston 14). In detail, the injector 28 is disposed such that its nozzle is oriented obliquely downwardly into the combustion chamber 16 from between the two intake ports 18 at a periphery of the ceiling 26 of the combustion chamber 16.

Further, a spark plug 32 which forcibly ignites a mixture gas inside the combustion chamber 16 is attached to the cylinder head 6 of the engine 1 for each cylinder 2. The spark plug 32 is disposed to extend downwardly from the central part of the ceiling 26 of the combustion chamber 16 while penetrating the cylinder head 6. Moreover, the cylinder head 6 is provided with valve mechanisms 36 which drive the intake valves 22 and the exhaust valves 24 of each cylinder 2, respectively. The valve mechanism 36 is, for example, a variable valve lift mechanism which can change a lift amount of each of the intake valve 22 and the exhaust valve 24, or a variable valve phase mechanism which can change a rotational phase of a camshaft with respect to the crankshaft 12.

The intake passage 40 is connected to one side surface of the engine 1 as described above, whereas, on the other side surface, an exhaust passage 44 which discharges burnt gas (exhaust gas) from the combustion chamber 16 of each cylinder 2 is connected. The exhaust passage 44 is provided thereon with a catalyst 45 (in detail, a catalytic converter) which purifies exhaust gas. Moreover, the exhaust passage 44 is connected, on a downstream side of the catalyst 45, to an exhaust gas recirculation (EGR) passage 46 which recirculates the exhaust gas to the intake passage 40. The EGR passage 46 is provided thereon with an EGR cooler 47 which cools exhaust gas (EGR gas) to be recirculated, and an EGR valve 48 which adjusts an amount of EGR gas to be recirculated to the intake passage 40.

Figure 2:
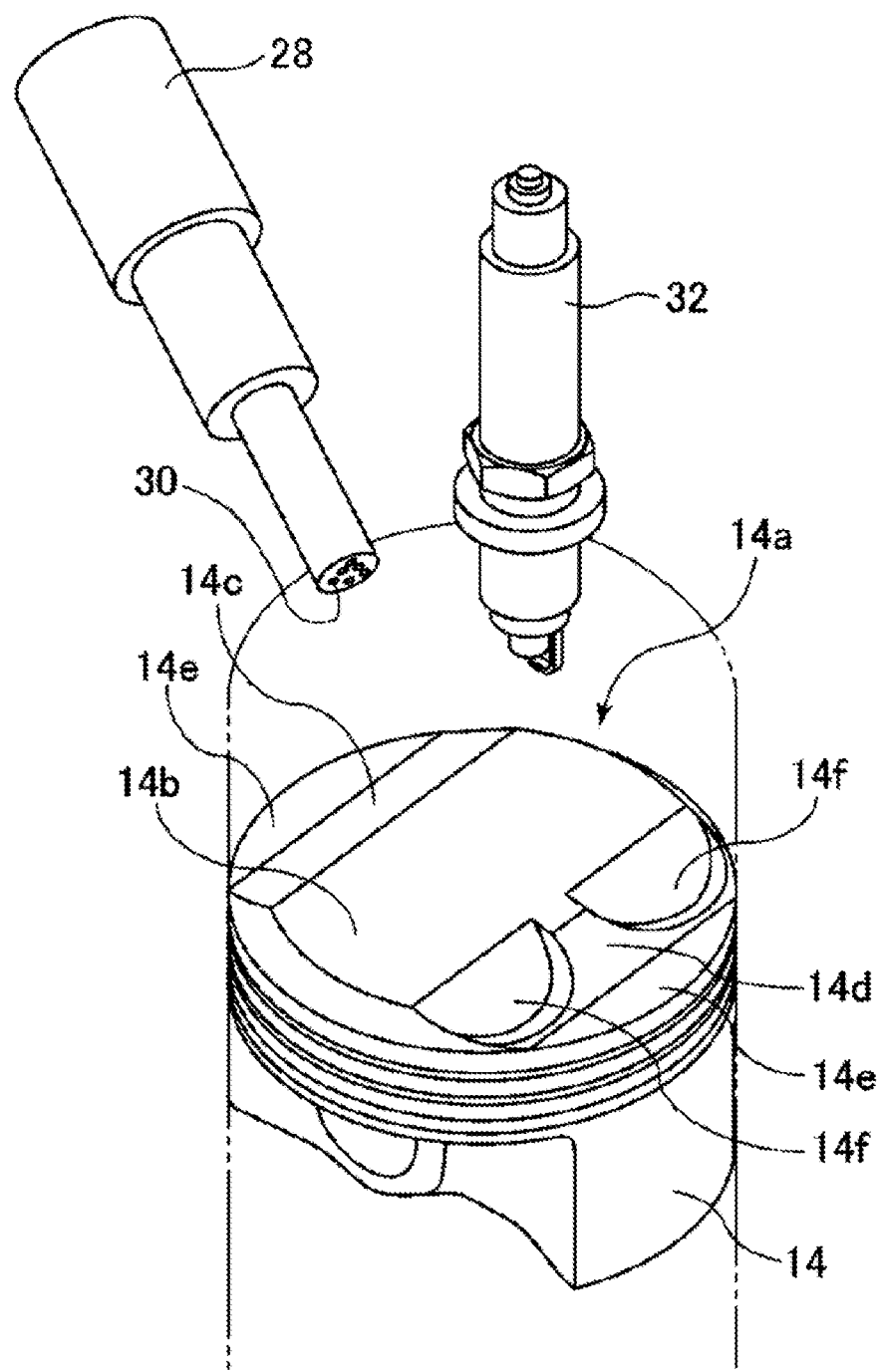
FIG. 2 is a perspective view of an engine according to this embodiment.

Next, FIG. 2 is a perspective view illustrating a detailed structure of the piston 14, the injector 28, and the spark plug 32 of the engine 1 according to this embodiment. As illustrated in FIG. 2, the injector 28 is a multi-nozzle type having a plurality of nozzles 30. The injector 28 is disposed such that an axial direction of the injector 28 inclines downwardly at a given angle with respect to a horizontal direction. Therefore, fuel spray injected from each nozzle 30 of the injector 28 spreads radially to obliquely downward from the periphery of the ceiling 26 of the combustion chamber 16.

Further, a piston crown surface 14a which constitutes a top part of the piston 14 is formed as a convex which bulges at its central area. For example, at the center of the piston crown surface 14a, a flat surface 14b extending along a horizontal surface orthogonal to the axial direction of the piston 14 is formed over a comparatively wide range. The piston crown surface 14a is not formed with a so-called cavity.

Further, the piston crown surface 14a is provided with an injector side sloped surface 14c extending obliquely upward toward the center from an end part of the piston crown surface 14a on the injector 28 side, and a counter-injector side sloped surface 14d extending obliquely upward toward the center from an opposite end part of the piston crown surface 14a. i.e., on the farther side from the injector 28 (hereinafter, may be referred to as a "counter-injector side" as necessary). The injector side sloped surface 14c and the counter-injector side sloped surface 14d are formed along the ceiling 26 of the combustion chamber 16 (see FIG. 1).

Further, in each end part of the piston crown surface 14a on the injector side and the counter-injector side, a horizontal surface 14e is formed. Moreover, the counter-injector side sloped surface 14d of the piston crown surface 14a is formed with exhaust valve recesses 14f which are concaved to avoid contact between the piston 14 and the exhaust valves 24, respectively. Note that contact between the piston 14 and the intake valves 22 is avoided by the injector side sloped surface 14c, etc.

Figure 3:
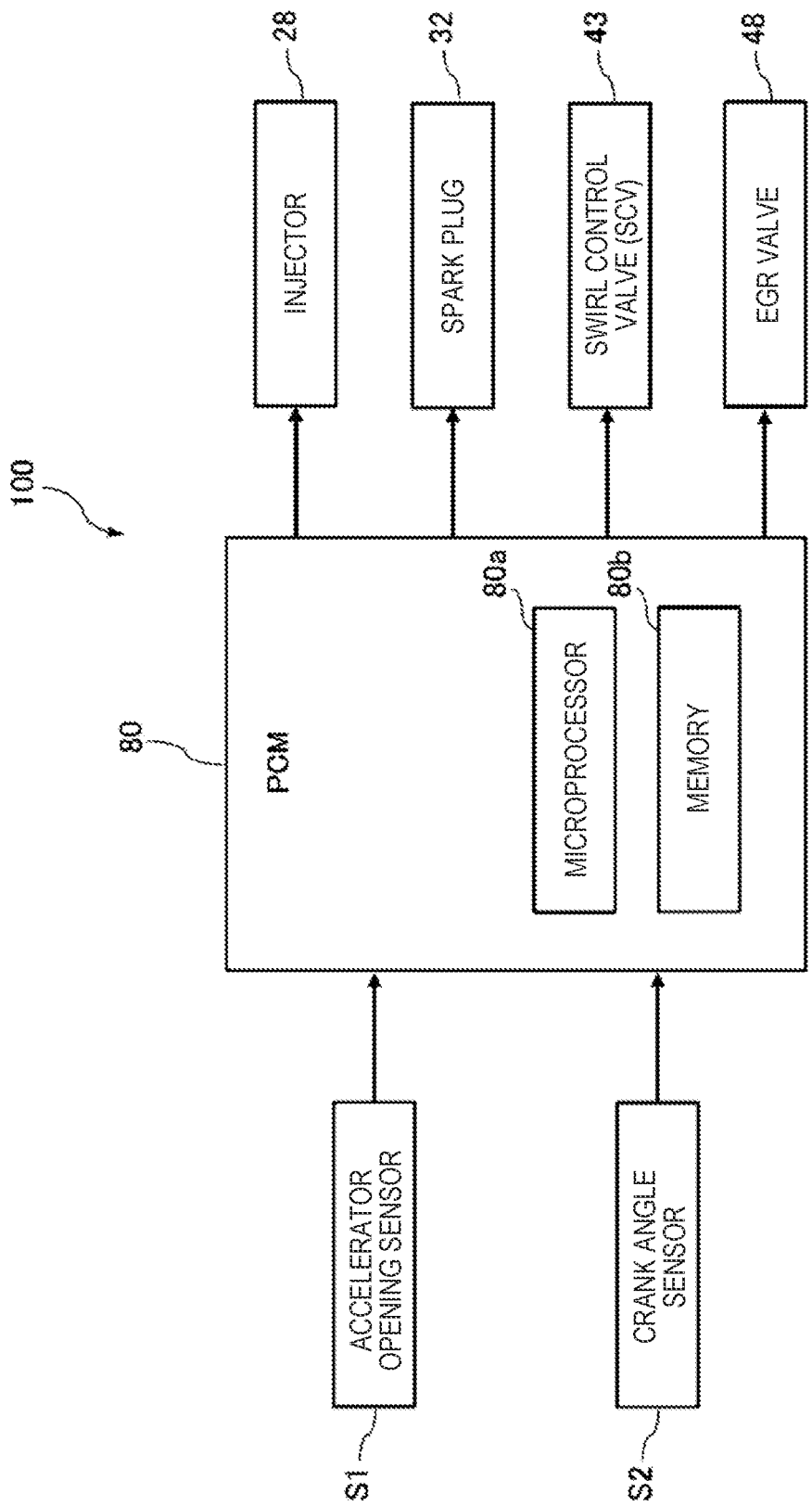
FIG. 3 is a block diagram illustrating an electrical configuration of the engine system according to this embodiment.

Next, FIG. 3 is a block diagram illustrating an electrical configuration of the engine system 100 according to this embodiment. PCM (Powertrain Control Module) 80 is comprised of a circuit, and is a controller based on a well-known microcomputer. The PCM 80 is provided with, for example, one or more microprocessor 80a (e.g., a CPU (Central Processing Unit)) which executes a program, memory 80b which is comprised of RAM (Random Access Memory) and/or ROM (Read Only Memory) and stores the program and data, and an I/O bus which inputs and outputs electric signals.

The PCM 80 is connected to various sensors. For example, the PCM 80 is mainly connected with an accelerator opening sensor S1 and a crank angle sensor S2. The accelerator opening sensor S1 detects an accelerator opening corresponding to a depressing amount of an accelerator pedal, and the crank angle sensor S2 detects a rotational angle of the crankshaft 12 (corresponding to an engine speed). Detection signals outputted from these sensors S1 and S2 are inputted into the PCM 80.

The PCM 80 calculates, based on the detection signals inputted from the sensors S1 and S2, a control amount of each device in accordance with a control logic defined in advance. The control logic is stored in the memory 80b. The control logic includes calculating a target amount and/or the control amount by using a map stored in the memory 80b. The PCM 80 outputs control signals related to the calculated control amounts mainly to the injector 28, the spark plug 32, the SCV 43, and the EGR valve 48.

Control Contents

Next, control contents executed by the PCM 80 according to this embodiment are described. Basically, the PCM 80 switches the opening and closing of the SCV 43 corresponding to a change in an operation state of the engine 1, that is, switches the SCV 43 from fully closed to fully opened, or from fully opened to fully closed. According to this, whether to introduce the swirl flow into the combustion chamber 16 by the SCV 43 is switched according to the operation state of the engine 1.

Figure 4:
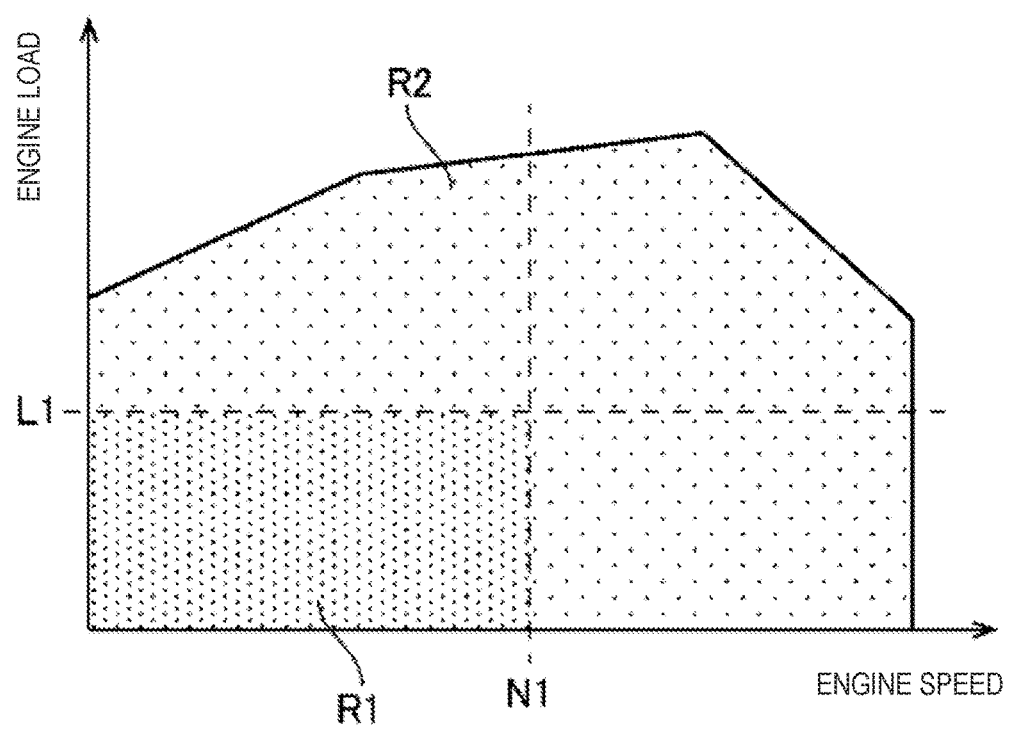
FIG. 4 illustrates operation ranges of the engine according to this embodiment.

First, with reference to FIG. 4, the operation ranges of the engine 1 in which the SCV 43 is set to fully closed or fully opened are described. FIG. 4 illustrates the operation ranges of the engine 1 defined by the engine speed indicated by the horizontal axis and the engine load indicated by the vertical axis. In an operation range R1 where the engine speed is below a speed threshold N1 (e.g., 2,500 rpm) and the engine load is below a load threshold L1, the SCV 43 is set to fully closed, that is, the engine 1 is operated using the swirl flow generated by closing the SCV 43. In addition, in the operation range R1, the injector 28 injects fuel all at once (batch injection) during an intake stroke of the engine 1 in the state where the swirl flow is generated, and thus homogeneous combustion being achieved in the engine 1.

On the other hand, in an operation range R2 where the engine speed is at or above the speed threshold N1 or the engine load is at or above the load threshold L1, the SCV 43 is set to fully opened, that is, the engine 1 is operated without using the swirl flow. Further, when the engine speed is below the speed threshold N1 in the operation range R2, the injector 28 dividedly injects fuel a plurality of times (split injection) during an intake stroke and a compression stroke of the engine 1, and thus stratified-charge combustion is achieved in the engine 1. In contrast, in a range where the engine speed is at or above the speed threshold N1 in the operation range R2, the injector 28 injects fuel all at once (batch injection) during an intake stroke of the engine 1, and thus homogeneous combustion is achieved in the engine 1.

Note that FIG. 4 illustrates an example in which the speed threshold N1 and the load threshold L1 are fixed values, respectively. However, in other examples, the speed threshold N1 may be lowered as the engine load increases, or the load threshold L1 may be lowered as the engine speed increases. Moreover, below, the operation range R1 may suitably be referred to as a "low-load range R1," and the operation range R2 may suitably be referred to as a "high-load range R2."

As described above, in the low-load range R1, the PCM 80 controls the SCV 43 to fully close so that a swirl flow is generated inside the combustion chamber 16, and controls the injector 28 to carry out the batch injection of fuel during an intake stroke so as to achieve homogeneous combustion. However, when such control is executed, since a gas flow inside the combustion chamber 16 is weak in the low-load range R1, fuel is distributed unevenly inside the combustion chamber 16, and thus, combustion may become unstable. For example, like this embodiment, when fuel is injected directly into the combustion chamber 16 from the injector 28 disposed inclinedly with respect to the axial direction of the piston 14, the fuel is spread by the swirl flow inside the combustion chamber 16, and thus is likely to be unevenly dispersed inside the combustion chamber 16. More details will be described below.

In the low-load range R1, at a fuel injection timing during the intake stroke (typically, at a comparatively early timing in the intake stroke), the swirl flow is not fully formed inside the combustion chamber 16 (i.e., the swirl flow is under formation). During the formation of the swirl flow, flows in various directions exist inside the combustion chamber 16, and thus, fuel injected at this timing is flowed in the various directions. Then, the fuel flows by being carried on the swirl flow while the swirl flow being formed. As a result, when the formation of the swirl flow is completed, almost all of the fuel is located near the periphery inside the combustion chamber 16, and the fuel is thereby unevenly dispersed inside the combustion chamber 16.

Therefore, in this embodiment, the PCM 80 executes control to reduce the uneven distribution of the injected fuel in the low-load range R1. For example, in the low-load range R1, supposing at the same speed, the PCM 80 controls the injector 28 to advance the fuel injection timing when the engine load is at a first load, compared with when the engine load is at a second load which is higher than the first load. Typically, the PCM 80 more largely advances the fuel injection timing as the engine load decreases.

Figure 5:
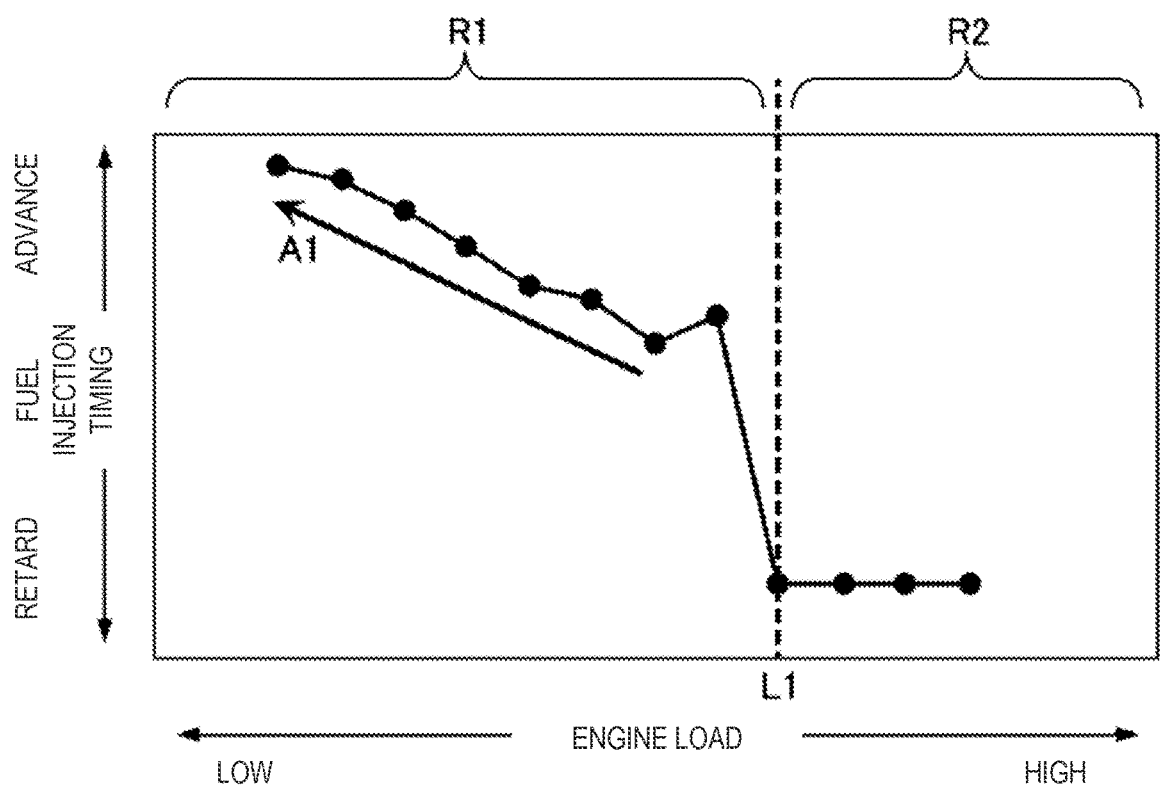
FIG. 5 is a map illustrating a relationship between an engine load and a fuel injection timing according to this embodiment.

Here, a basic concept of the control related to this embodiment is described with reference to FIG. 5. FIG. 5 illustrates a map of the fuel injection timing (vertical axis) applied according to the engine load (horizontal axis) at a certain engine speed (e.g., 1,500 rpm) below the speed threshold N1. As illustrated in FIG. 5, in this embodiment, basically, the PCM 80 more largely advances the fuel injection timing as the engine load decreases in the low-load range R1 where the SCV 43 is fully closed (see an arrow A1). According to this, even when the flow inside the combustion chamber 16 is weakened due to the decrease in the engine load, by advancing the fuel injection timing corresponding to the decrease in the engine load, mixability of fuel and intake air (i.e., a period of time for the mixing of fuel and intake air) inside the combustion chamber 16 can be secured. As a result, the mixability of fuel and intake air can be improved, and the uneven distribution of fuel inside the combustion chamber 16 can be reduced.

Figure 6:
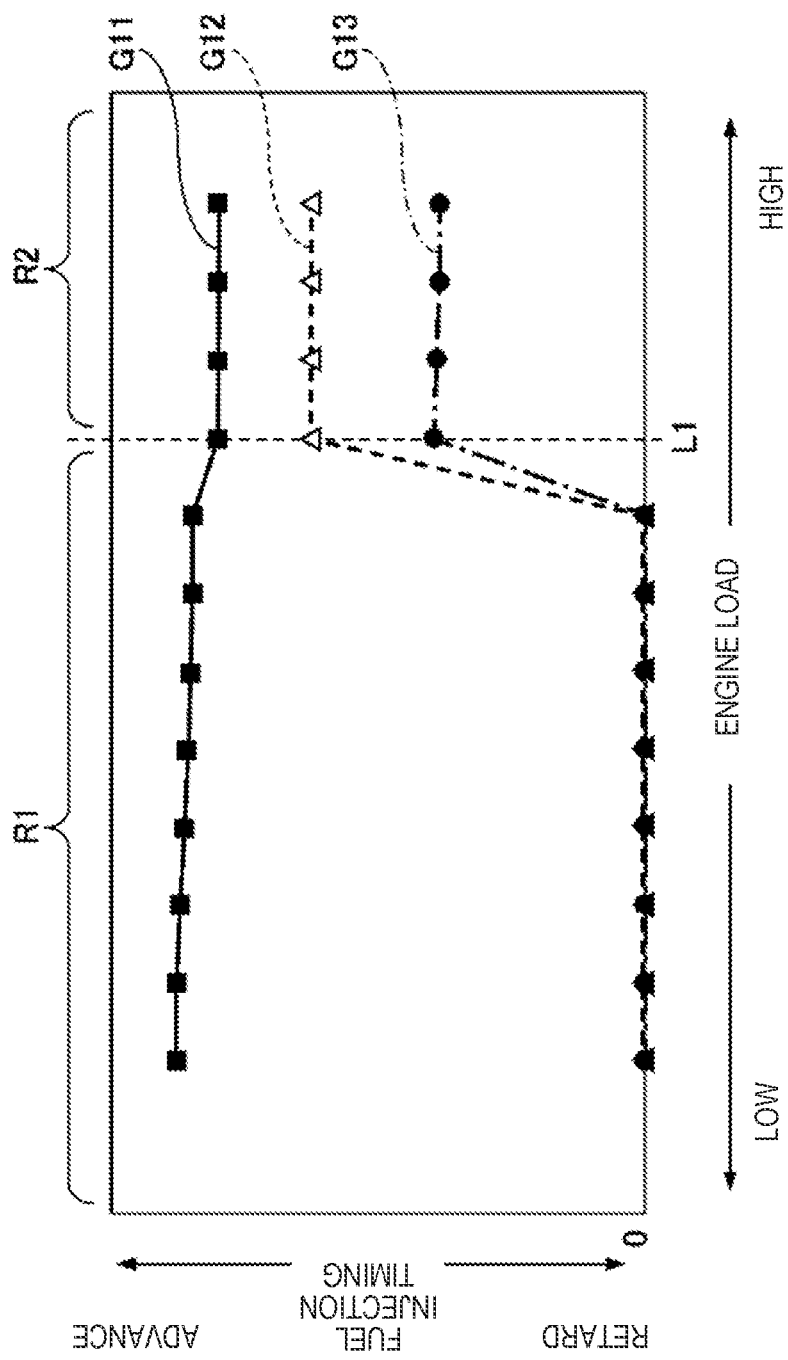
FIG. 6 is a map illustrating a relationship between the engine load and a fuel injection timing of each of a batch injection and a split injection according to this embodiment.
Figure 7:
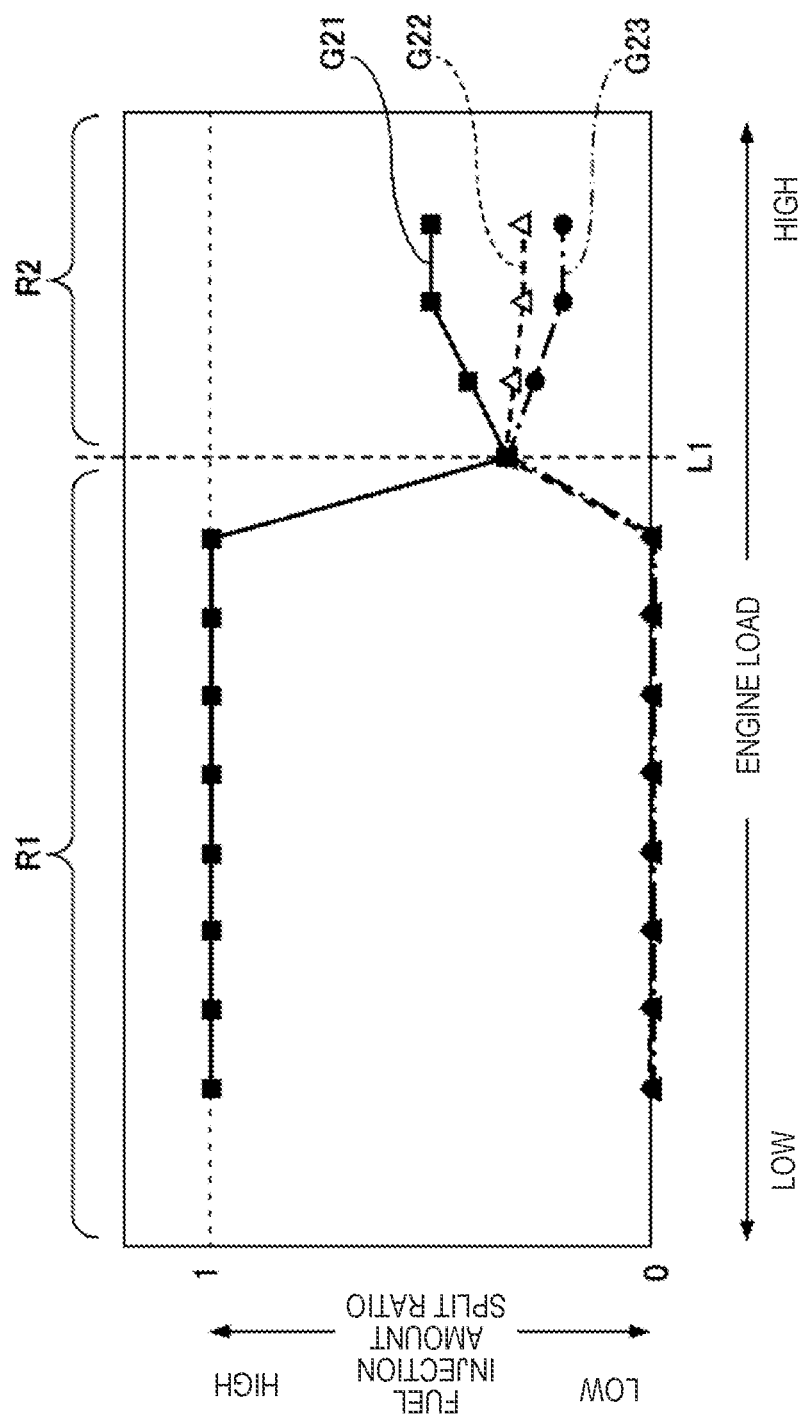
FIG. 7 is a map illustrating a relationship between the engine load and a split ratio of an amount of fuel injection according to this embodiment.

Next, the control related to this embodiment is supplemented with reference to FIGS. 6 and 7. FIG. 6 is a map illustrating the fuel injection timing (vertical axis) applied in each of the batch injection and the split injection according to the engine load (horizontal axis) at a certain engine speed (e.g., 1,500 rpm) below the speed threshold N1. In FIG. 6, a graph G11 indicates a first fuel injection, a graph G12 indicates a second fuel injection, and a graph G13 indicates a third fuel injection. Note that FIG. 5 is a vertically enlarged view of the graph G11 illustrated in FIG. 6.

As illustrated in FIG. 6, the PCM 80 executes only one fuel injection (i.e., the batch injection) in the low-load range R1 where the SCV 43 is set to fully closed (see G11), and executes three fuel injections (i.e., the split injection) in the high-load range R2 where the SCV 43 is set to fully opened (see G11, G12, and G13). For example, when the PCM 80 executes the split injection in the high-load range R2, the first and second fuel injections are performed during an intake stroke, and the third fuel injection is performed during a compression stroke.

Next, FIG. 7 is a map illustrating a split ratio of an amount of fuel injection (vertical axis) applied according to the engine load (horizontal axis) at a certain engine speed (e.g., 1,500 rpm) below the speed threshold N1. In FIG. 7, a graph G21 indicates the first fuel injection, a graph G22 indicates the second fuel injection, and a graph G23 indicates the third fuel injection. As illustrated in FIG. 7, in the high-load range R2, the PCM 80 changes the split ratio of the fuel injection amount in the first to third injections according to the engine load. For example, the PCM 80 basically sets the split ratio of the first injection amount to be higher than that of each of the second injection amount and the third injection amount, and the split ratio of the second injection amount to be higher than that of the third injection amount. Moreover, the split ratio of the first injection amount is set to be higher as the engine load increases.

Figure 8:
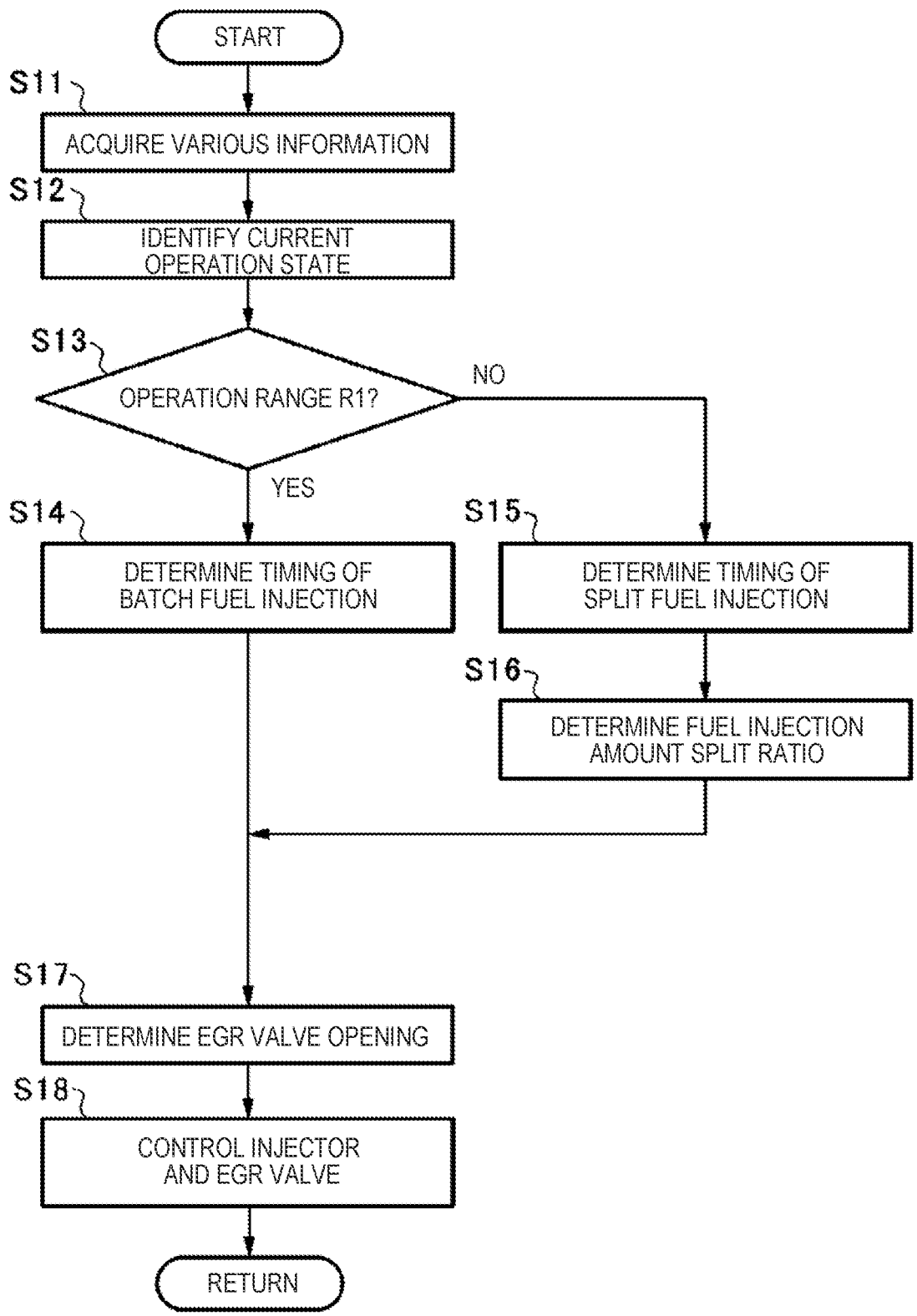
FIG. 8 is a flowchart illustrating control according to this embodiment.

Next, a control flow related to this embodiment is described with reference to FIG. 8. FIG. 8 is a flowchart illustrating the control according to this embodiment. This control is repeatedly executed by the PCM 80 at a given cycle. First, at Step S11, the PCM 80 acquires various information. For example, the PCM 80 at least acquires the detection signals of the accelerator opening sensor S1 and the crank angle sensor S2 described above.

Next, at Step S12, the PCM 80 identifies, based on the information acquired at Step S11, the current operation state of the engine 1 (in detail, the current engine speed and the current engine load). Here, the PCM 80 acquires the engine speed based on the crank angle (the rotational angle of the crankshaft 12) corresponding to the detection signal of the crank angle sensor S2. Moreover, the PCM 80 acquires a target torque of the vehicle based on the accelerator opening corresponding to the detection signal of the accelerator opening sensor S1, and then, calculates the engine load corresponding to the target torque.

Next, at Step S13, the PCM 80 determines, based on the operation state of the engine 1 identified at Step S12, whether the engine speed and the engine load belong to the operation range (low-load range) R1. When the PCM 80 determines that the engine speed and the engine load belong to the operation range R1 (Step S13: YES), the PCM 80 proceeds to Step S14. In the operation range R1, the batch injection of fuel is executed during an intake stroke. Therefore, at Step S14, the PCM 80 determines the timing of the batch injection according to the engine load. For example, the PCM 80 determines the fuel injection timing to be applied at the current engine load with reference to the map as illustrated in FIG. 5. Note that since the map as illustrated in FIG. 5 is defined for each engine speed, the map corresponding to the current engine speed is selected (this is similarly applied to the maps illustrated in FIGS. 6, 7, and 9 which will be described later). Then, the PCM 80 proceeds to Step S17.

On the other hand, when the PCM 80 determines that the engine speed and the engine load do not belong to the operation range R1 (Step S13: NO), the PCM 80 proceeds to Step S15. In this case, the engine speed and the engine load belong to the operation range (high-load range) R2 (below the speed threshold N1), and thus, the split injection of fuel is executed during an intake stroke and a compression stroke. At Step S15, the PCM 80 determines the fuel injection timing of each split injection according to the engine load. For example, the PCM 80 determines the fuel injection timing of each of the first to third fuel injections to be applied at the current engine load with reference to the map as illustrated by the graphs G11, G12, and G13 in FIG. 6. Then, at Step S16, the PCM 80 determines the split ratio of the fuel injection amount in the split injection according to the engine load. For example, the PCM 80 determines the split ratio of the fuel injection amount between the first to third fuel injections to be applied at the current engine load with reference to the map as illustrated by the graphs G21, G22, and G23 in FIG. 7. Then, the PCM 80 proceeds to Step S17.

Figure 9:
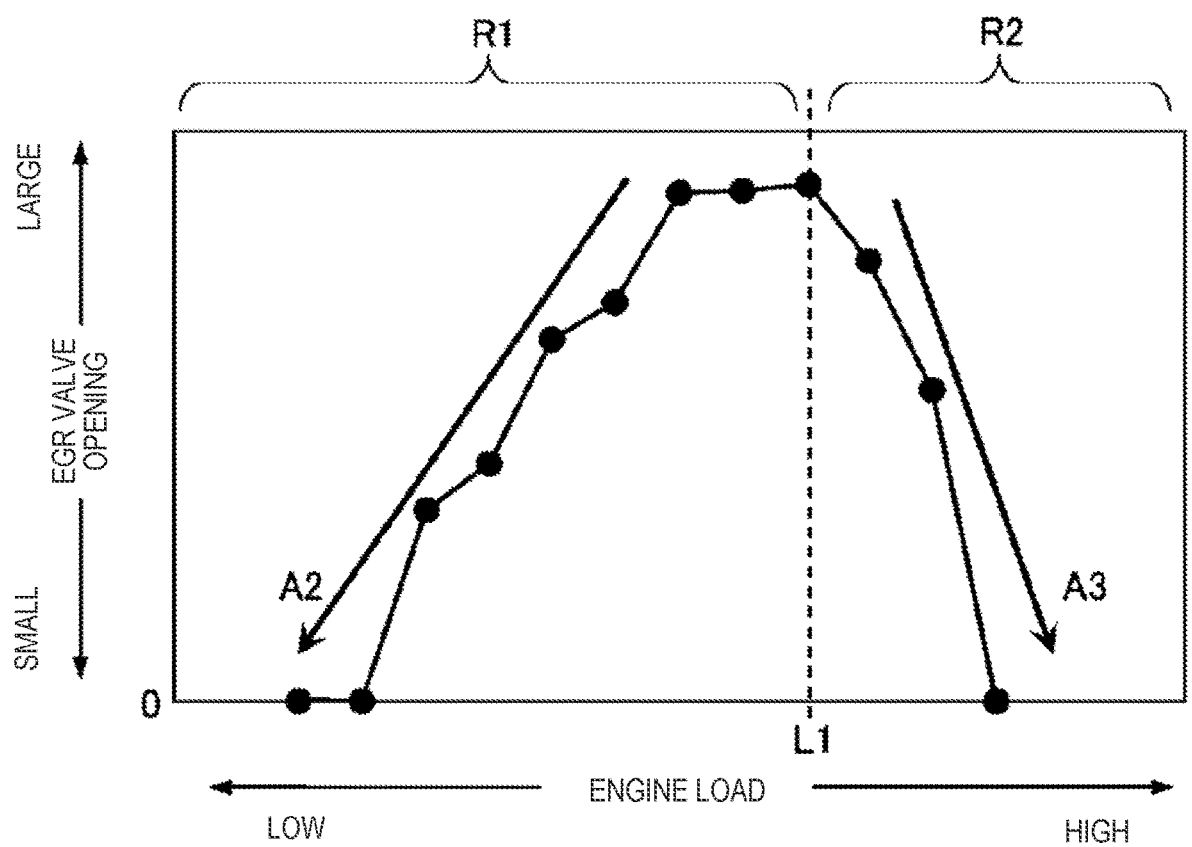
FIG. 9 is a map illustrating a relationship between the engine load and opening of an exhaust gas recirculation (EGR) valve according to this embodiment.

Next, at Step S17, the PCM 80 determines the opening of the EGR valve 48 (EGR valve opening) according to the engine load. Here, a method of determining the EGR valve opening according to the engine load is described with reference to FIG. 9. FIG. 9 is a map illustrating the EGR valve opening (vertical axis) applied according to the engine load (horizontal axis) at a certain engine speed (e.g., 1,500 rpm). As illustrated in FIG. 9, in the low-load range R1, the EGR valve opening is basically set smaller as the engine load decreases so as to reduce an amount of EGR gas (see an arrow A2). This is because combustion stability degrades as the engine load decreases. That is, by reducing the amount of EGR gas as the engine load becomes lower, combustion stability can be secured in the low-load range R1. On the other hand, in the high-load range R2, the EGR valve opening is set smaller as the engine load increases so as to reduce the amount of EGR gas (see an arrow A3).

Referring back to FIG. 8, at Step S17, the PCM 80 determines the EGR valve opening to be applied at the current engine load with reference to the map as illustrated in FIG. 9. Then, the PCM 80 proceeds to Step S18. At Step S18, the PCM 80 controls the injector 28 based on the fuel injection timing of the batch injection determined at Step S14, or the fuel injection timing and the split ratio of the split injection determined at Steps S15 and S16, as well as controlling the EGR valve 48 based on the EGR valve opening determined at Step S17. Then, the PCM 80 ends the flow illustrated in FIG. 8.

Operation and Effects

Next, operation and effects of the engine system 100 according to this embodiment are described.

In the engine system 100 according to this embodiment, in the low-load range R1, the SCV 43 generates the swirl flow and fuel is injected during an intake stroke. Further, at a fixed engine speed in the low-load range R1, the PCM 80 advances the fuel injection timing when the engine load is at the first load, compared with when the engine load is at the second load (which is higher than the first load). According to this, even when the flow inside the combustion chamber 16 is weakened due to the decrease in the engine load, by advancing the fuel injection timing corresponding to the decrease in the engine load, the mixability of fuel and intake air (i.e., the period of time for the mixing of fuel and intake air) inside the combustion chamber 16 can be secured. As a result, according to this embodiment, in the low-load range R1, the uneven distribution of fuel inside the cylinder 2 can appropriately be prevented, thus securing of the combustion stability being possible.

Moreover, according to this embodiment, at a fixed engine speed in the low-load range R1, the PCM 80 controls the EGR valve 48 to reduce the amount of EGR gas when the engine load is at the first load, compared with when the engine load is at the second load. Typically, the PCM 80 sets the EGR valve opening smaller as the engine load decreases so as to reduce the amount of EGR gas (see FIG. 9). As a result, the combustion stability can effectively be secured in the low-load range R1.

Further, according to this embodiment, in the low-load range R1, the PCM 80 executes the batch injection of fuel during an intake stroke, thereby the homogeneous combustion appropriately being achieved.

Further, according to this embodiment, in the high-load range R2 (below the speed threshold N1), the PCM 80 sets the SCV 43 to fully opened and executes the split injection of fuel from an intake stroke to a compression stroke, thereby the stratified-charge combustion appropriately being achieved.

Further, according to this embodiment, since the piston crown surface 14a of the engine 1 is formed to be substantially flat without a cavity, the swirl flow inside the combustion chamber 16 can effectively be maintained.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine
2 Cylinder
14 Piston
14a Piston Crown Surface
16 Combustion Chamber
18 Intake Port
28 Injector (Fuel Injection Valve)
32 Spark Plug
40 Intake Passage
43 Swirl Control Valve (SCV)
44 Exhaust Passage
45 Catalyst
46 EGR Passage
48 EGR Valve
80 PCM (Controller)
100 Engine System

What is claimed is:

1. An engine system, comprising:
   an engine including:
      a cylinder defining a combustion chamber;
      a piston configured to reciprocate inside the cylinder; and
      a fuel injection valve provided incliningly with respect to an axial direction of the piston and configured to directly inject fuel into the cylinder;
   a swirl control valve provided inside an intake passage and configured to generate a swirl flow inside the cylinder at least when the swirl control valve closes, the intake passage being configured to supply intake air to the cylinder; and
   a controller configured to control the fuel injection valve and the swirl control valve,
   wherein when an engine load is below a given threshold, the controller controls the swirl control valve to close, and controls the fuel injection valve to inject fuel during an intake stroke of the engine, and
   wherein while the engine load is below the threshold, at a fixed engine speed, the controller controls the fuel injection valve to advance a fuel injection timing when the engine load is at a first load, compared with when the engine load is at a second load higher than the first load.

2. The engine system of claim 1, further comprising:
   an exhaust gas recirculation (EGR) passage configured to recirculate exhaust gas of the engine as EGR gas to the intake passage; and
   an EGR valve provided to the EGR passage and configured to adjust an amount of EGR gas to be recirculated to the intake passage,
   wherein while the engine load is below the threshold, at a fixed engine speed, the controller controls the EGR valve to reduce the amount of EGR gas when the engine load is at the first load, compared with when the engine load is at the second load.

3. The engine system of claim 2, wherein when the engine load is below the threshold, the controller controls the fuel injection valve to inject fuel once during an intake stroke.

4. The engine system of claim 3, wherein when the engine load is at or above the threshold, the controller controls the swirl control valve to open, and controls the fuel injection valve to inject fuel a plurality of times from an intake stroke to a compression stroke.

5. The engine system of claim 4, wherein a crown surface of the piston is formed to be substantially flat without a cavity.

6. The engine system of claim 1, wherein when the engine load is below the threshold, the controller controls the fuel injection valve to inject fuel once during an intake stroke.

7. The engine system of claim 1, wherein when the engine load is at or above the threshold, the controller controls the swirl control valve to open, and controls the fuel injection valve to inject fuel a plurality of times from an intake stroke to a compression stroke.

8. The engine system of claim 1, wherein a crown surface of the piston is formed to be substantially flat without a cavity.

9. The engine system of claim 2, wherein when the engine load is at or above the threshold, the controller controls the swirl control valve to open, and controls the fuel injection valve to inject fuel a plurality of times from an intake stroke to a compression stroke.

10. The engine system of claim 2, wherein a crown surface of the piston is formed to be substantially flat without a cavity.

11. The engine system of claim 3, wherein a crown surface of the piston is formed to be substantially flat without a cavity.

12. The engine system of claim 4, wherein when the fuel injection is split into a first injection, a second injection, and a third injection in this order, the controller sets a split ratio of an amount of the first injection to be higher than a split ratio of an amount of each of the second injection and the third injection, and sets the split ratio of the amount of the second injection to be higher than the split ratio of the amount of the third injection.

13. The engine system of claim 7, wherein when the fuel injection is split into a first injection, a second injection, and a third injection in this order, the controller sets a split ratio of an amount of the first injection to be higher than a split ratio of an amount of each of the second injection and the third injection, and sets the split ratio of the amount of the second injection to be higher than the split ratio of the amount of the third injection.

14. The engine system of claim 5, wherein when the fuel injection is split into a first injection, a second injection, and a third injection in this order, the controller sets a split ratio of an amount of the first injection to be higher than a split ratio of an amount of each of the second injection and the third injection, and sets the split ratio of the amount of the second injection to be higher than the split ratio of the amount of the third injection.

15. The engine system of claim 8, wherein when the fuel injection is split into a first injection, a second injection, and a third injection in this order, the controller sets a split ratio of an amount of the first injection to be higher than a split ratio of an amount of each of the second injection and the third injection, and sets the split ratio of the amount of the second injection to be higher than the split ratio of the amount of the third injection.

16. The engine system of claim 12, wherein the controller sets the split ratio of the amount of the first injection to be higher as the engine load increases.

17. The engine system of claim 13, wherein the controller sets the split ratio of the amount of the first injection to be higher as the engine load increases.

18. The engine system of claim 14, wherein the controller sets the split ratio of the amount of the first injection to be higher as the engine load increases.

19. The engine system of claim 15, wherein the controller sets the split ratio of the amount of the first injection to be higher as the engine load increases.

* * * * *